UNITED STATES PATENT OFFICE.

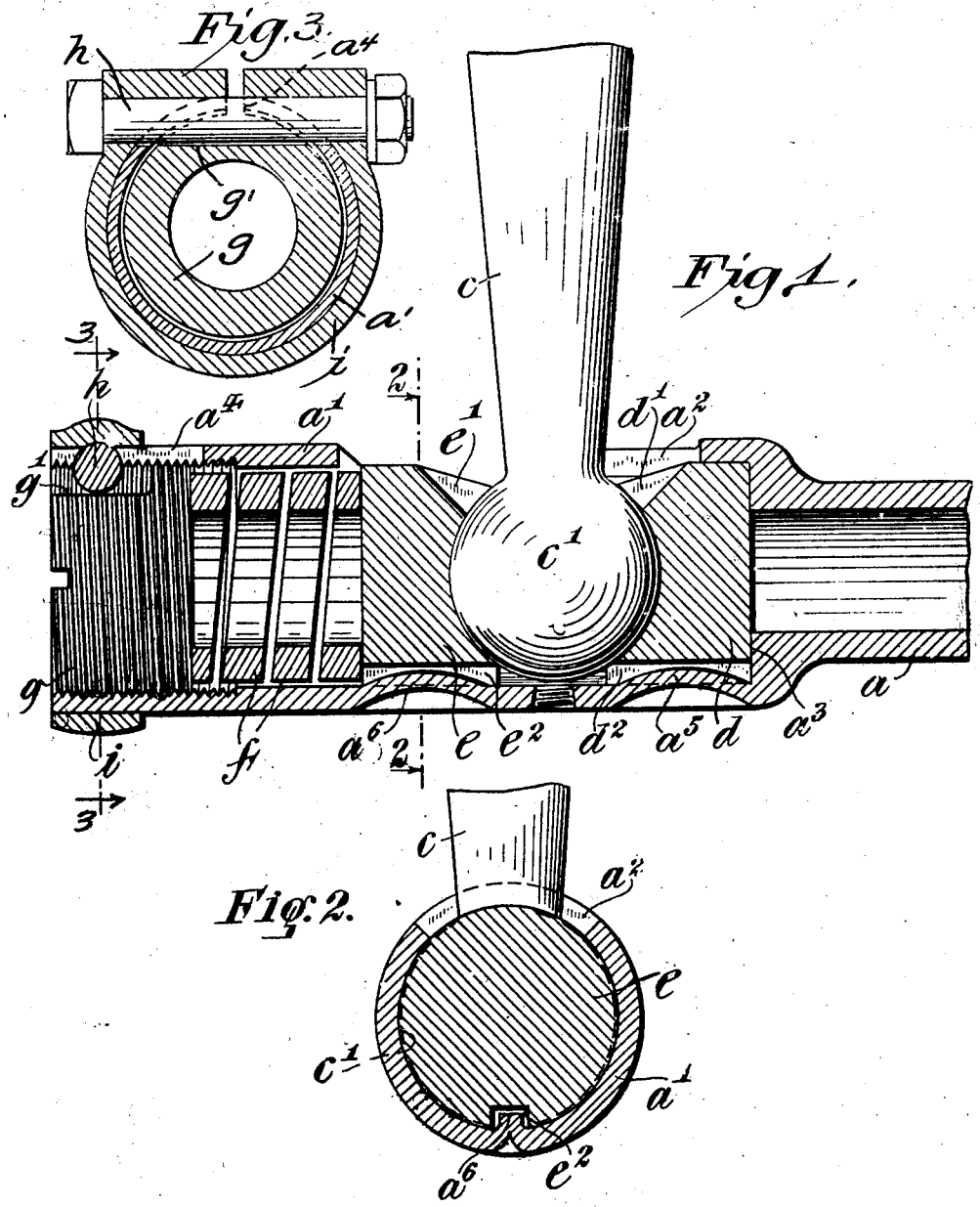

CASCIOUS H. DE LA MONTE, OF NEW YORK, N. Y., ASSIGNOR TO INTERNATIONAL MOTOR COMPANY, OF NEW YORK, N. Y., A CORPORATION OF DELAWARE.

DRAG-LINK.

1,382,175.   Specification of Letters Patent.   Patented June 21, 1921.

Application filed August 22, 1919. Serial No. 219,093.

*To all whom it may concern:*

Be it known that I, CASCIOUS H DE LA MONTE, a citizen of the United States, residing in the borough of Manhattan of the city of New York, in the State of New York, have invented certain new and useful Improvements in Drag-Links, of which the following is a specification, reference being had to the accompanying drawing, forming a part hereof.

This invention relates to an improved drag link of the type in which there are incorporated between the steering arm and the steering wheels, devices for absorbing the road shocks. The drag link and the associated elements are not new, broadly, but the present invention has for its object to provide in known drag links of the type referred to special features of construction which are of importance both to the manufacturer and the assembler. The improvements result in a cheaper construction and one which permits the parts to be more readily assembled and disassembled than heretofore. The details of construction will appear in connection with the description of the illustrated embodiment in the accompanying drawing, in which—

Figure 1 is a view in section of a fragment of the improved drag link, a portion of the steering arm being shown in elevation.

Fig. 2 is a view in transverse section through the link shown in Fig. 1, taken along the plane indicated by the line 2—2 of Fig. 1 and looking in the direction of the arrows.

Fig. 3 is a cross section taken on the line 3—3 of Fig. 1.

The drag link $a$, which is tubular, has formed at one end thereof a sleeve $a'$, slotted at its upper side, as at $a^2$, to receive the steering arm $c$, on the lower end of which is formed a ball $c'$. Within the sleeve $a$ are slidably disposed two ball socket blocks $d$, $e$ which receive the ball $c'$ of the steering arm $c$. These blocks $d$, $e$ are slotted at their upper sides, at $d'$, $e'$, respectively, to permit angular movement of the lever arm. One of the blocks $d$ rests against a shoulder $a^3$ formed at the inner end of the sleeve $a'$. The other block is engaged by a spring $f$ which seats on a plug cap $g$ threaded into the open end of the sleeve $a'$. The tension of the spring $f$ and, accordingly, the pressure of the bearing block $e$ against the ball $c'$ may be regulated by adjusting the threaded cap $g$ in a manner which will be obvious. The cap $g$ is milled off, as at $g'$, to provide a locking face adapted to be engaged by a bolt $h$ which is threaded through the sleeve $a'$ and an annular clamp $i$ which may be slipped on the end of the sleeve. The sleeve $a'$ is slotted, as at $a^4$, to provide a degree of resiliency. The split clamp $i$ is locked thereon by setting up on the bolt $h$. The bolt $h$ and clamp $i$ obviously will be placed in position after the plug $g$ has been threaded in a sufficient distance to give the desired tension on the spring $f$. The milled section $g'$ of the plug $g$ must be brought in proper position to permit the engagement therewith of the surface of the bolt $h$ when the latter is engaged, for the purpose of preventing rotation of the cap.

Another feature of the invention, which is of great importance to the manufacturer and will lessen materially the initial cost of manufacture of such drag links and greatly facilitate their assembling, resides in the provision of improved means for preventing rotation of the socket members $d$, $e$. In the sleeve $a'$ are punched two lugs $a^5$, $a^6$ directly in the metal and these lugs rest within channels $d^2$, $e^2$ in the respective blocks $d$, $e$, the relation of the lugs and channels being such as to permit sliding movement of the blocks while preventing rotary movement thereof. The blocks are held positively against rotation but may be readily moved into position or moved out upon assembling or disassembling or for their intended play when in use.

The appended claim is intended to cover the improved drag link as a new article of manufacture and also the particular combination of elements for locking the spring seat adjustably in the end of the sleeve.

I claim as my invention:

In combination, a drag link formed with a slotted tubular sleeve at one end, socket members slidably mounted in a sleeve, said members having channels, a steering arm having a ball formed at its end, the ball end adapted to rest between the socket members, said sleeve being formed with a shoulder at one end on which seats one of said socket members, a spring bearing against the other of said socket members, lugs struck inwardly in the metal of said sleeve to engage the channels in the socket members, a plug cap threaded in the end of the sleeve and forming a seat for said spring, said cap having a milled section, a split ring clamp encircling the slotted end of the sleeve, and a bolt passing through the clamp and engaging the milled section of the cap to hold it against rotation.

This specification signed this 20th day of August, A. D. 1919.

CASCIOUS H DE LA MONTE.